United States Patent
Vincent

(10) Patent No.: US 7,543,033 B2
(45) Date of Patent: Jun. 2, 2009

(54) METHOD FOR USER-SPECIFIED ERROR CORRECTION IN AN INSTANT MESSAGING SYSTEM

(75) Inventor: Christopher R. Vincent, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/852,829

(22) Filed: Sep. 10, 2007

(65) Prior Publication Data

US 2008/0005253 A1 Jan. 3, 2008

Related U.S. Application Data

(63) Continuation of application No. 10/042,668, filed on Jan. 8, 2002, now Pat. No. 7,296,057.

(51) Int. Cl.
*G06F 15/16* (2006.01)
(52) U.S. Cl. .............................. 709/206; 709/203
(58) Field of Classification Search .......... 709/203–207
See application file for complete search history.

(56) References Cited

U.S. PATENT DOCUMENTS

| | | | |
|---|---|---|---|
| 4,641,309 A | 2/1987 | Nakano et al. | |
| 4,646,250 A | 2/1987 | Childress | |
| 5,353,259 A | 10/1994 | Howes et al. | |
| 5,481,597 A | 1/1996 | Given | |
| 5,761,689 A | 6/1998 | Rayson et al. | |
| 5,809,112 A | 9/1998 | Ryan | |
| 5,832,221 A | 11/1998 | Jones | |
| 5,870,548 A | 2/1999 | Nielsen | |
| 5,881,069 A * | 3/1999 | Cannon et al. | ............... 714/748 |
| 5,909,667 A | 6/1999 | Leontiades et al. | |
| 5,966,351 A | 10/1999 | Carleton et al. | |
| 6,023,779 A | 2/2000 | Fullam et al. | |
| 6,047,315 A | 4/2000 | Tsuji et al. | |
| 6,052,812 A | 4/2000 | Chen et al. | |
| 6,072,942 A | 6/2000 | Stockwell et al. | |
| 6,088,694 A | 7/2000 | Burns et al. | |
| 6,128,763 A | 10/2000 | LoGalbo et al. | |
| 6,219,638 B1 | 4/2001 | Padmanabhan et al. | |
| 6,430,602 B1 | 8/2002 | Kay et al. | |
| 6,484,196 B1 | 11/2002 | Maurille | |
| 6,597,771 B1 | 7/2003 | Svoboda | |

(Continued)

*Primary Examiner*—Yasin M Barqadle
(74) *Attorney, Agent, or Firm*—John E. Campbell; Jose Gutman; Fleit, Gibbons, Gutman, Bongini & Bianco, P.L.

(57) ABSTRACT

A method and system enter a correction for a previously sent message, determine whether to send a complete corrected message or a message correction specification, and send the selected message to a messaging server. The messaging server receives the message correction specification and a message identifier (ID), and sends the message correction specification and the message ID to a recipient client system if a message with a corresponding message ID has previously been sent to the recipient client system. Then, the recipient client system receives the message correction specification and message ID, retrieves the message with a corresponding message ID from its conversation log, corrects the message, updates the conversation log, and activates an alert to notify a user of an update. If the message has not previously been sent, the messaging server corrects the message and sends the corrected message and the message ID to the recipient client system.

12 Claims, 6 Drawing Sheets

U.S. PATENT DOCUMENTS

| | | |
|---|---|---|
| 6,611,802 B2 | 8/2003 | Lewis et al. |
| 6,611,849 B1 | 8/2003 | Raff et al. |
| 6,721,795 B1 * | 4/2004 | Eldreth .................. 709/232 |
| 6,748,447 B1 | 6/2004 | Basani et al. |
| 7,305,627 B2 * | 12/2007 | Tannenbaum ............... 715/751 |
| 2002/0099777 A1 | 7/2002 | Gupta et al. |
| 2002/0194278 A1 | 12/2002 | Golan |
| 2003/0023689 A1 * | 1/2003 | Brown et al. ................ 709/206 |

* cited by examiner

METHOD FOR USER-SPECIFIED ERROR CORRECTION IN AN INSTANT MESSAGING SYSTEM

CROSS REFERENCE TO RELATED APPLICATIONS

This is a continuation of application Ser. No. 10/042,668, filed Jan. 8, 2002, now U.S. Pat. No. 7,296,057. The entire disclosure of prior application Ser. No. 10/042,668 is hereby incorporated by reference herein.

BACKGROUND OF THE INVENTION

1. Field of the Invention

This invention generally relates to the field of instant messaging, and more particularly relates to a system and method for user-specified error correction in an instant messaging system.

2. Description of Related Art

Instant messaging has become an integral part of collaboration within engineering and business organizations. Within many businesses, instant messaging has become a mission-critical application, vital to quickly forming and coordinating task-oriented teams across geographical and organizational boundaries.

In conversations conducted over instant messaging systems (such as Lotus Sametime®, and AOL Instant Messenger™, etc.), users tend to compose short messages, dispatch them immediately, and then notice spelling and grammatical errors, omissions, and other errors that they have typed. By the time these errors are noticed, the message has already been sent to and displayed for one or more other parties, and it is too late to correct the original message. Common practice is to send a new message clarifying the original, erroneous message.

Therefore a need exists to overcome the problems with the prior art as discussed above, and particularly for a method for user-specified error correction in an instant messaging system.

SUMMARY OF THE INVENTION

According to a preferred embodiment of the present invention, a method and system enter a correction for a previously sent message, determine whether to send a complete corrected message or a message correction specification, and send the selected message to a messaging server. The messaging server receives the message correction specification and a message identifier (ID), and sends the message correction specification and the message ID to a recipient client system if a message with a corresponding message ID has previously been sent to the recipient client system. Then, the recipient client system receives the message correction specification and message ID, retrieves the message with a corresponding message ID from its conversation log, corrects the message, updates the conversation log, and activates an alert to notify a user of an update. If the message has not previously been sent, the messaging server corrects the message and sends the corrected message and the message ID to the recipient client system.

DESCRIPTION OF THE PREFERRED EMBODIMENTS

The present invention, according to a preferred embodiment, overcomes problems with the prior art by allowing the users of an instant messaging system to perform additional editing operations on messages they have already sent. These corrections are then automatically reflected in the recipients' displays of the ongoing instant messaging conversation (conversation log).

Popular instant messaging systems display a running log of all instant messages sent and received in a particular conversation. Participants in a conversation typically run instant messaging clients, which are often connected via an instant messaging server. When a user dispatches a message, the server routes it to recipients as a protocol message entity. A preferred embodiment introduces a new protocol entity, a message correction.

Figure 1:
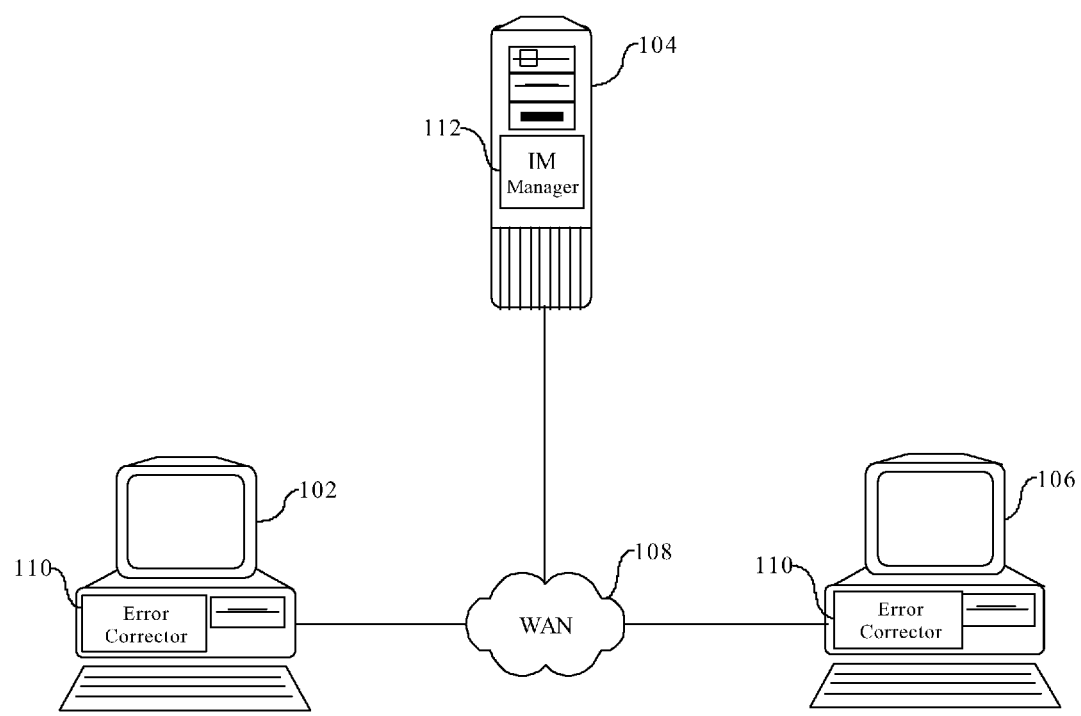
FIG. 1 is a block diagram illustrating an exemplary instant messaging system with a user-specified error corrector in accordance with a preferred embodiment of the present invention.

FIG. 1 illustrates an exemplary instant messaging system with a user-specified error corrector in accordance with a preferred embodiment of the present invention. The system includes at least two client computer systems 102, 106 that are communicatively coupled to a messaging server system 104 via a network interface 108. The network interface 108 may be a wide area or local area network interface, and may also be a wired communication link or a wireless communication link. Each client computer system 102, 106, contains an instant messaging client 210 for sending and receiving instant messages that includes an error corrector 110. Each client computer system 102, 106, has the ability to be a message originator or a message recipient. The client computer systems 102, 106, may also be communicatively coupled with the world-wide-web (not shown), via a wide area network interface that is a wired, wireless, or combination of wired and wireless network communication links 108. The messaging server 104 contains an instant message manager 112 for controlling the flow of messages between client systems 102, 106.

Figure 2:
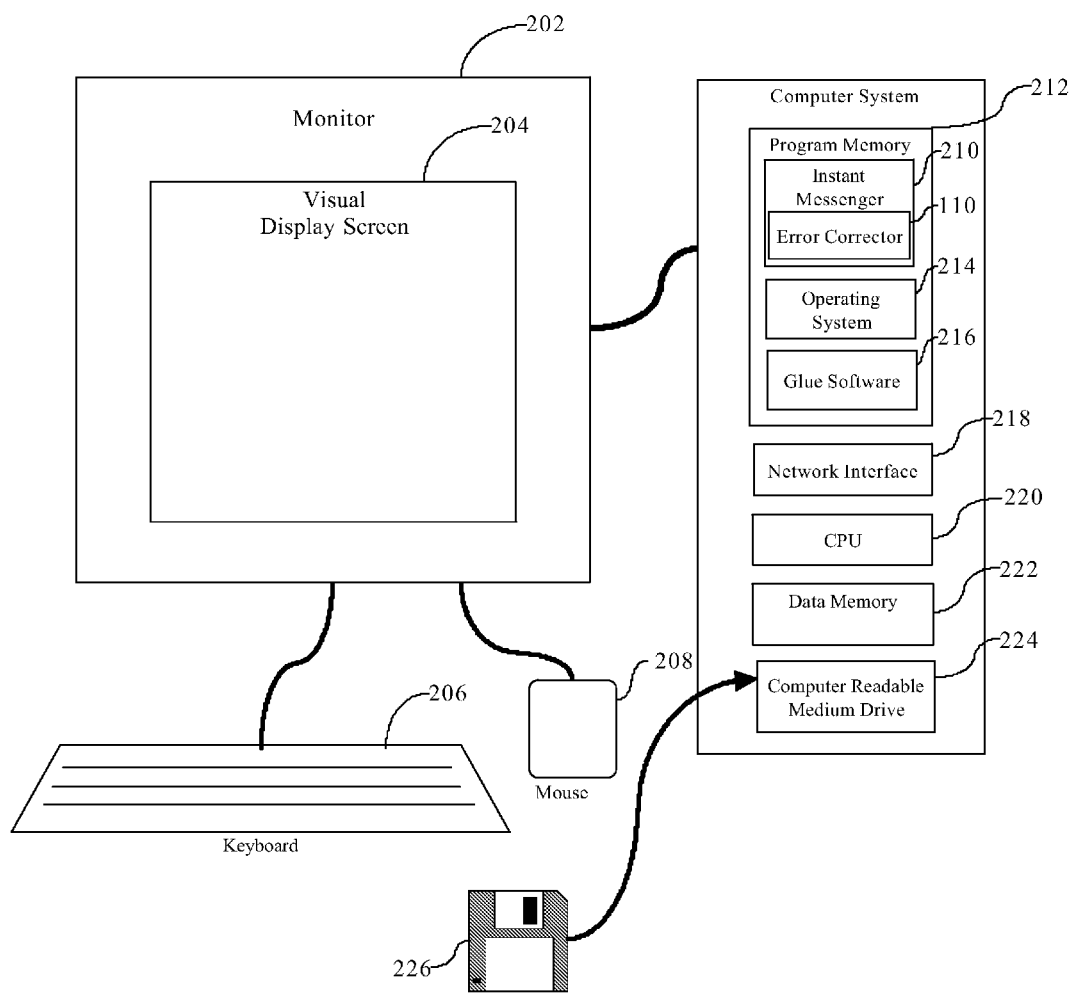
FIG. 2 is a more detailed block diagram showing an end-user computer system in the system of FIG. 1 according to a preferred embodiment of the present invention.
Figure 3:
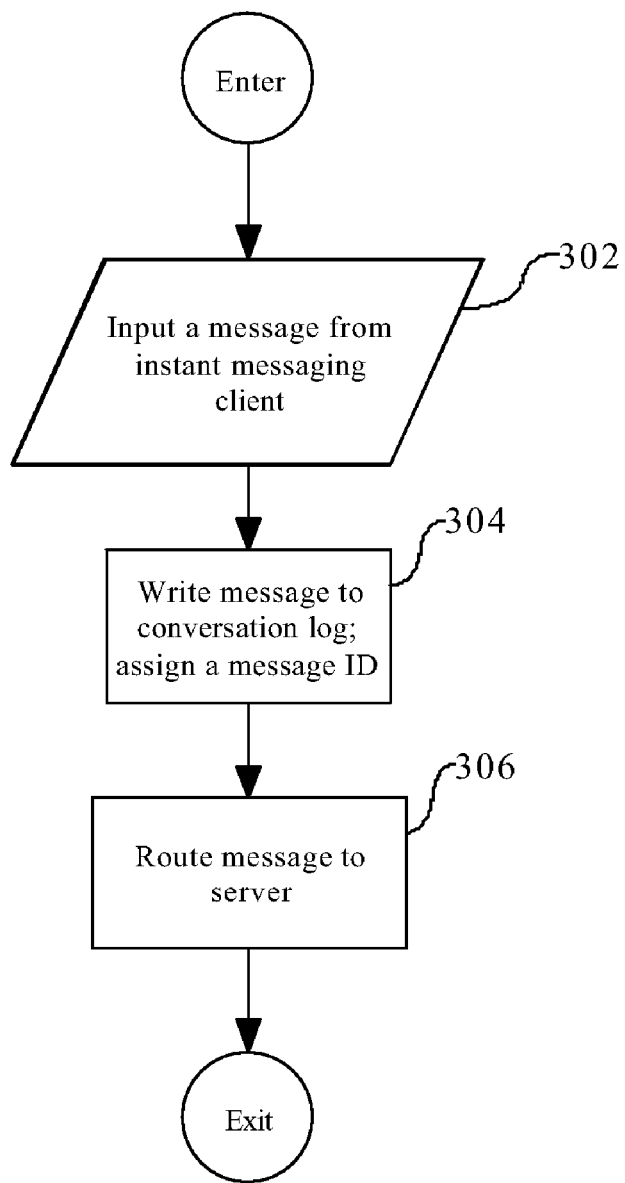
FIGS. 3, 4, 5, and 6 are operational flow diagrams illustrating exemplary operational sequences for the system of FIG. 1, according to a preferred embodiment of the present invention.

FIG. 2 illustrates a client computer system 102, 106, according to the present example, that includes a controller/processor unit 220, which processes instructions, performs calculations, and manages the flow of information through the computer system 102, 106. Additionally, the controller/processor 220 is communicatively coupled with program memory 212. Included within program memory 212 are an instant messaging client 210 (which will be discussed later in greater detail), operating system platform 214, and glue software 216. The operating system platform 214 manages resources, such as the data stored in data memory 222, the scheduling of tasks, and processes the operation of the instant messaging client 210 in the program memory 212. The operating system platform 214 also manages a graphical display interface that, according to the present example, comprises the screen 204 on the display monitor 202. Information is displayed via the screen 204 for visual output of information to a user of the computer system 102, 106. A user input interface comprises the keyboard 206 and the mouse 208 for receiving user input from a user of the computer system 102, 106. A communication network interface 218 allows for communicating with a network link 108. Additionally, the operating system platform 214 also manages many other basic tasks of the computer system 102, 106 in a manner well known to those of ordinary skill in the art.

Glue software 216 may include drivers, stacks, and low-level application programming interfaces (API's) and provides basic functional components for use by the operating system platform 214 and by compatible applications that run on the operating system platform 214 for managing communications with resources and processes in the computing system 102, 106.

The controller/processor unit 220 manages resources, such as the data stored in data memory 222, the scheduling of tasks, and the operation of the instant messaging client 210 in the program memory 212. The controller/processor unit 220 may also manage a communication network interface 218 for communicating with the network link 108, and a computer-readable medium drive 224. Additionally, the controller/processor unit 220 also manages many other basic tasks of the computer system 102, 106, in a manner well known to those of ordinary skill in the art.

Each client computer system 102, 106, may include, among other things, one or more computers, a display monitor 202, and at least a computer readable medium 226. The computers preferably include means for reading and/or writing to the computer readable medium. The computer readable medium allows a computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface 218, including a wired network or a wireless network, that allow a computer to read such computer readable information.

FIGS. 3, 4, 5, and 6 are operational flow diagrams illustrating exemplary operational sequences for the system of FIG. 1. The typical operational flow of the messaging system 100 is presented in FIG. 3, whereby the originating client system 102 enters the sequence, at step 302, wherein a user enters a message to the instant messaging client 210. The message is assigned a unique message identifier (ID), at step 304, and written to a conversation log. Then, at step 306, the message is routed to the messaging server 104.

Figure 4:
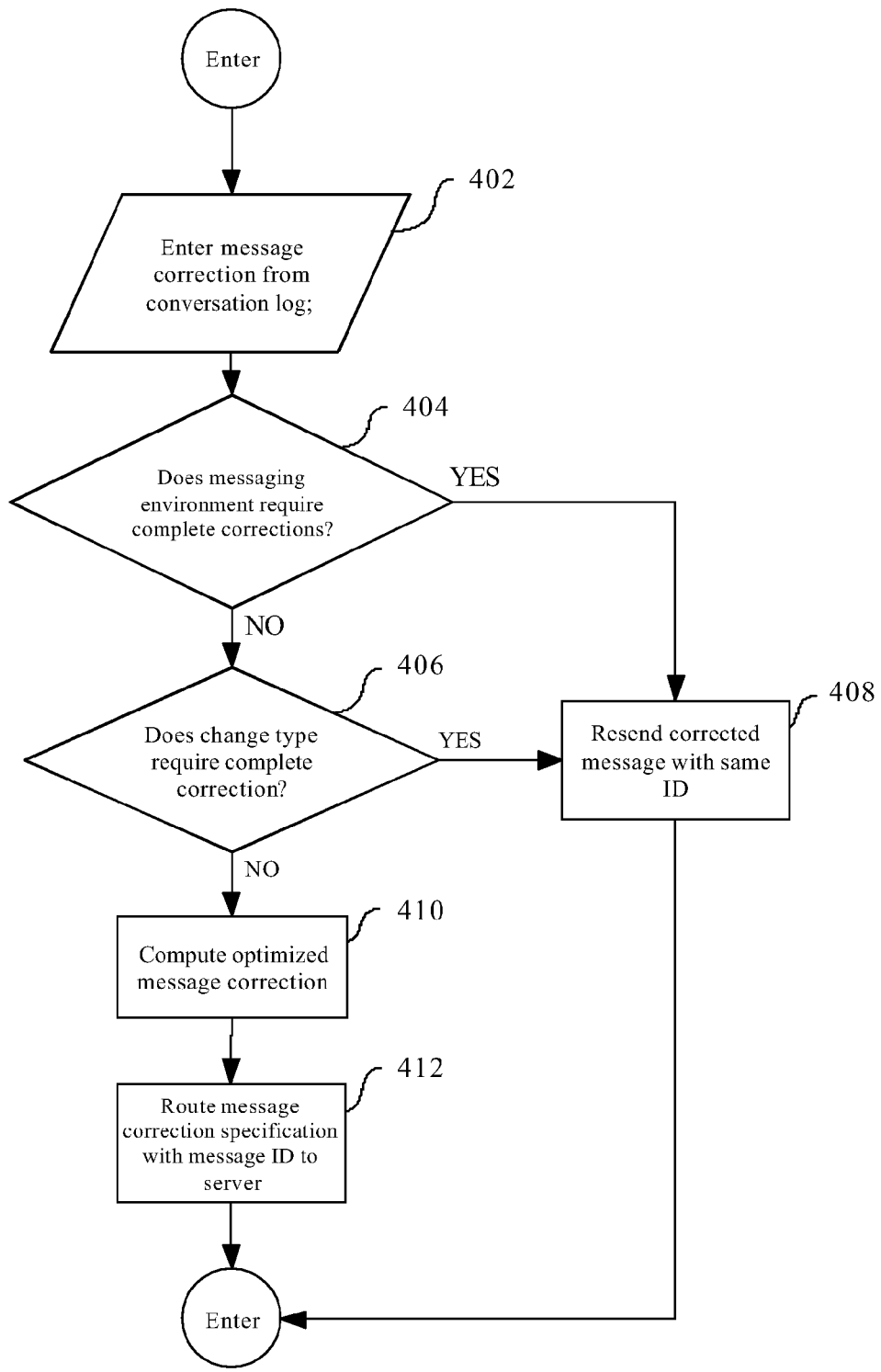

When a message correction occurs, the originating client system 102 follows the operational sequence of FIG. 4. The originating client system 102 enters the sequence, at step 402, wherein a user enters a message correction by selecting the message to be corrected from the conversation log and editing the previously sent message directly in the conversation log. According to one preferred embodiment of the present invention, the error corrector 110 then queries the message server 104 to see if the messaging system 100 requires a complete message resend as a correction message. Note that an alternative preferred embodiment may include a local query to a configuration parameter (not shown) in memory 222 that indicates when a complete message is required by the messaging system 100 for resending an error correction message. This alternative embodiment would avoid the additional query to the server 104 thereby enhancing network communication throughput. If the messaging system 100 requires a complete message resend (step 404), the originating system 102 resends the entire corrected message, at step 408. Otherwise, the originating system 102 checks, at step 406, whether the type of change for error correction requires sending a complete correction of a previous message, and if so, resends the entire corrected message. This includes cases where the server 104 implements message processing services such as language translation, or when transmitting binary formats such as compressed images. If an entire correction is not required (step 404), the error corrector 110 computes an optimized message correction, at step 410. Message corrections are encoded as a set of at least one text replacement specification, which, in the event of a plurality of specifications, would be applied sequentially to update the content of a message. Each text replacement specification contains a start character index, an end character index, and insertion text. For example:

To replace a word, the correction would specify the first letter of the word, the character following the last character of the word, and the new word to display in its place.

To delete a word, the correction would specify the same character indices as above but with blank insertion text.

To insert a new word, the character indices would share the same value.

The originating system 102, then routes the message correction specification, with the message ID to the server 104, at step 412. Either error correction, whether a complete message resend or an optimized message correction, sends at least one correction message to the receiving client 106 and provides the same resulting end-user behavior, with varying impacts on, and utilization of, the network, the originating system 102, and the message server 104.

Figure 5:
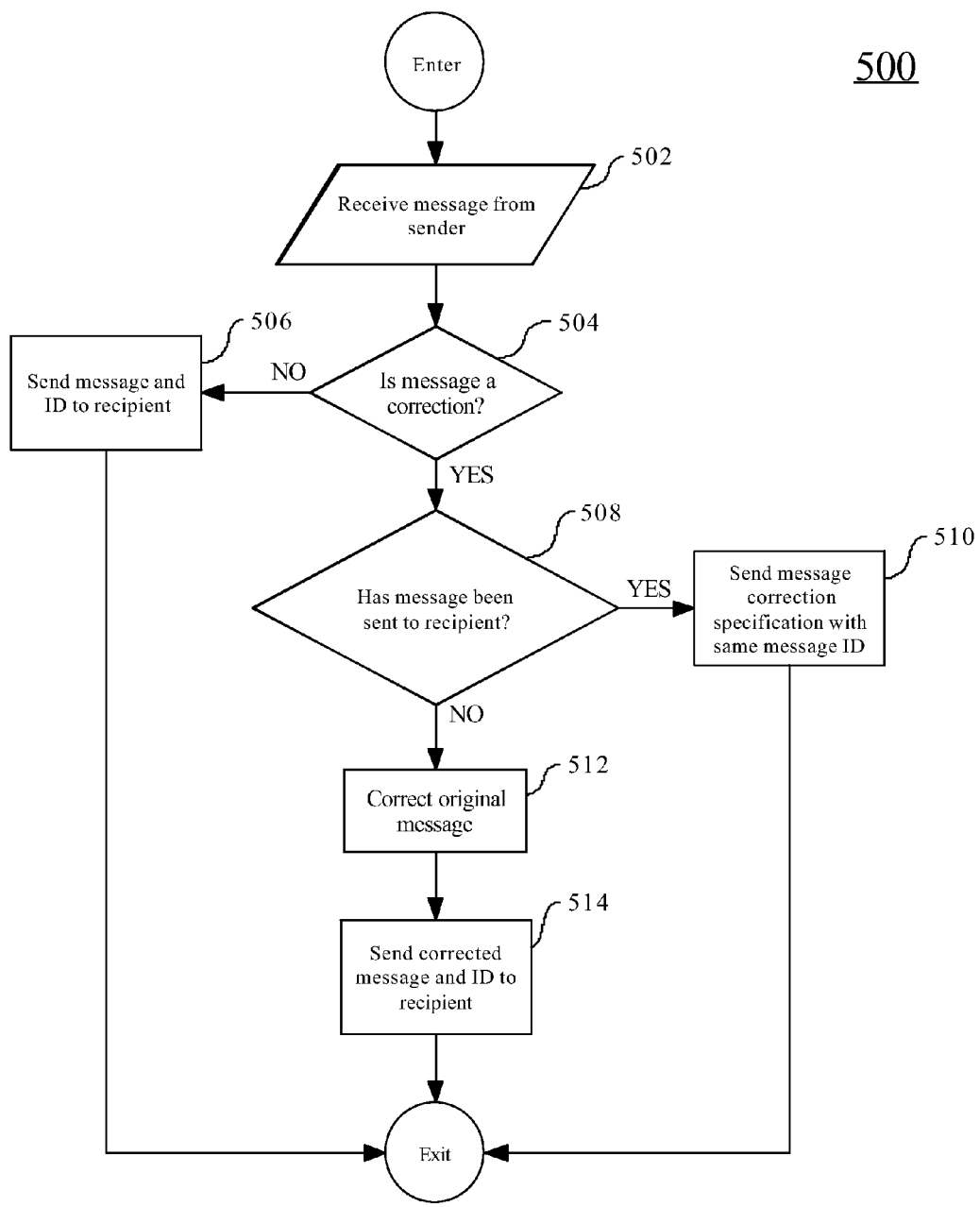

FIG. 5 displays a preferred operational sequence for the message server 104 as will be discussed below. The message server 104 receives a message from an originating client system 102, at step 502. The instant message manager 112 checks, at step 504, to see if the incoming message is a correction. If not, the message manager 112 sends the message and its ID to the receiving client 106, at step 506. If the message is a correction, the message manager 112, at step 508, checks to see the original message has already been sent to the recipient. If so, the message manager 112 sends the message correction specification with the same message ID to the receiving system 106. However, in the usually rare event that the message has not been sent, the message manager corrects the original message, at step 512, and sends the corrected message and ID to the receiving system 106, at step 514.

The messaging server 104 may also include an ephemeral storage system (not shown). This allows the messaging server 104 to enable server-side processing by keeping its own log of the messages in a conversation (which may be purged once the parties end the conversation). The originating client system 102 issues the same optimized corrections as described above. If no server-side processing is required, the optimized correction is simply forwarded. If server-side processing is required by the system configuration, the messaging server 104 looks up the complete message in its log, applies the correction, computes a new optimized message correction, and sends it to the recipient client system 106.

Examples of system configurations that may require server-side processing include such factors as: language translation of messages, correction of binary format information in a message, correction of image information in a message, enhancing system processing efficiency (by moving processing intensive functions to a more powerful processor such as in a server 104), and enhancing network communication efficiency (such as by delivering reduced amount of message information and/or reduced duplication of delivered message information between the client system 102, the message server 104, and the receiving system 106). Other system configuration factors, and including factors representing trade-offs between the aforementioned factors, for implementing server-side processing in a particular embodiment should be obvious to those of ordinary skill in the art in view of the present discussion. For example, a particular system configuration may benefit by an enhanced system processing efficiency (e.g., selection of a particular processor on a network to handle processing) or by an enhanced network communication efficiency such as by reducing an overall amount of delivered information overhead. These types of system configuration factors, and many variations thereof as are obvious to those of ordinary skill in the art, are anticipated by the preferred embodiments of the present invention.

As discussed above, if a particular system configuration requires server-side processing then the server 104 looks up the complete message in its log, applies the correction, computes a new optimized message correction, and sends it to the recipient system 106. The new correction message represents the difference between a processed version of the original logged message and a processed version of the corrected message. All this server-side processing may take place without the knowledge of the sender or the recipient.

In an alternative embodiment, the message server 104 signals the originating client system 102 to enter a "server-side processing" mode, denoting that server-side messaging is being performed and that the server 104 is not maintaining a message log. The originating client system 102 issues a full copy of the original message, along with a message correction specification. These two pieces of information allow the server 104 to compute an optimized correction message to send to the recipient client system 106. In this scenario the sender is aware that server-side processing is being performed, but the process is totally transparent to the recipient.

Alternatively, the messaging server 104 signals the recipient client system 106 to enter a "server-side processing" mode, denoting that server-side messaging is being performed and that the messaging server 104 is not maintaining a message log. The originating client system 102 always issues full copies of corrected messages, which the messaging server 104 processes and routes the full copies of corrected messages to the recipient client system 106. This scenario has the least desirable network bandwidth efficiency, and both the sender and recipient are typically aware that server-side processing has occurred.

Figure 6:
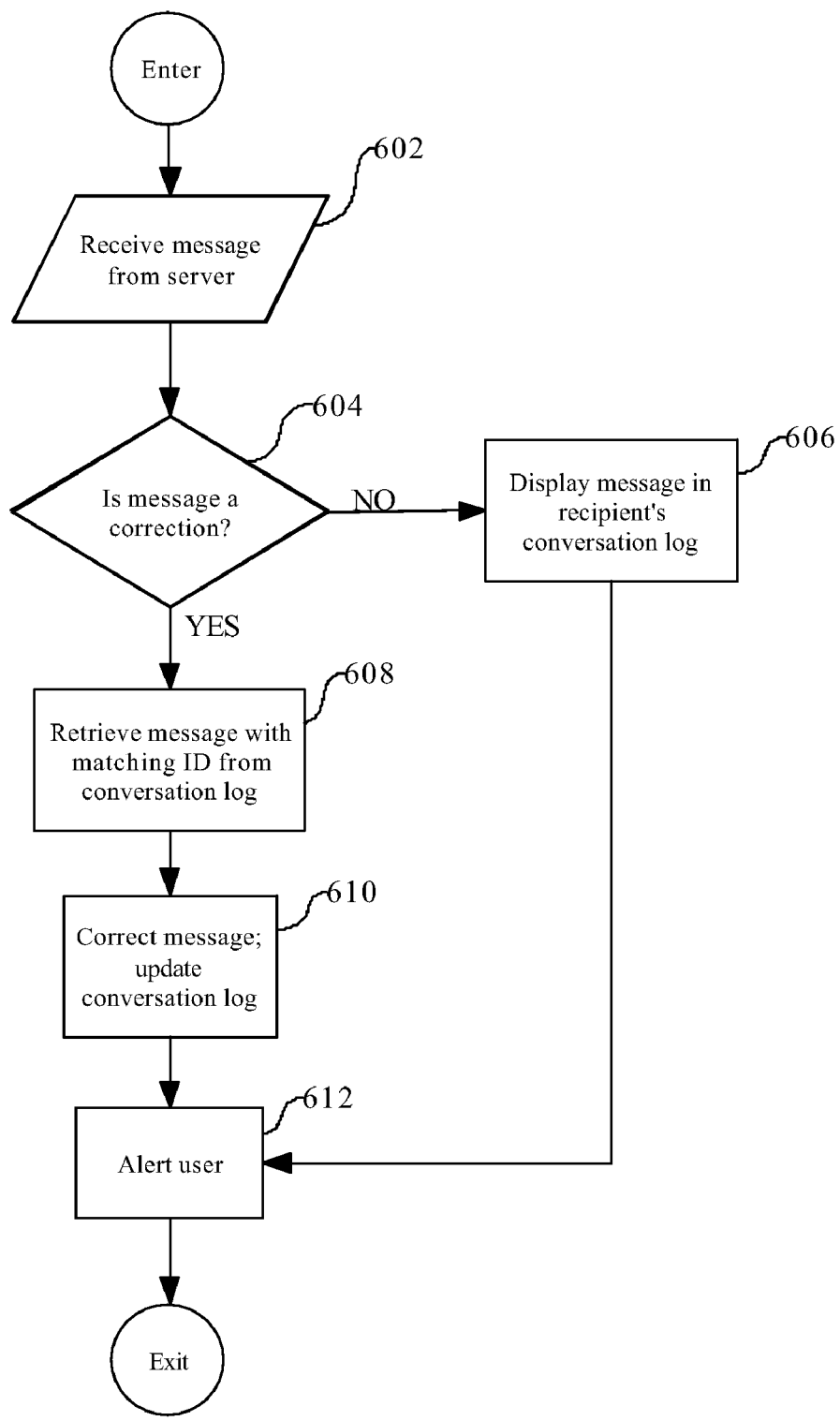

FIG. 6 illustrates the operational sequence of the recipient client system 106. The recipient client system 106 receives a message from the message server 104, at step 602. If the message is not a correction, at step 604, then the recipient system 106 displays the message in its conversation log, at step 606. If the message is a correction, the error corrector 110, at step 608, retrieves the message with the matching message ID from the conversation log. At step 610, the error corrector 110, corrects the message and updates the conversation log. Finally, the error corrector 110 alerts the user of the update, at step 612. The alert could include such cues as highlighting a display of the corrected text in the conversation log and/or activating an auditory alert to signal a change has occurred.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

A preferred embodiment of the present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method of instant messaging comprising:

sending a message by an instant messaging originating device and destined for reception by an instant messaging recipient device;

displaying the message in a conversation log at the instant messaging originating device;

displaying the message in another conversation log at the instant messaging recipient device;

correcting the message previously sent from the instant messaging originating device during an ongoing instant messaging conversation between the instant messaging originating device and the instant messaging recipient device by selecting a message to be corrected from the conversation log at the instant messaging originating device and editing the previously sent message directly in the conversation log;

determining, with the instant messaging originating device, that a message correction of the previously sent message requires sending a message correction specification;

prior to sending the message correction specification, the instant messaging originating device sending a query to an instant message manager on an instant messaging server as to whether the instant messaging server requires a message correction specification comprising a complete message resend or whether the instant messaging server requires a message correction specification comprising an optimized message correction;

the instant messaging originating device receiving, from the instant message manager, a response to the query;

sending from the instant messaging originating device to the instant message manager on the instant messaging server the message correction specification that specifies a correction of the previously sent message, wherein the message correction specification comprises one of: the complete message resend and the optimized message correction, based on the response to the query;

sending the message correction specification from the instant message manager on the instant messaging server to the instant messaging recipient device; and updating the other conversation log at the instant messaging recipient device with the corrected message.

2. The method of claim 1, wherein the determining step comprises determining whether at least one factor of the following corresponds to a system:

allowing message correction by message correction specification;

implementing message processing services at a messaging server; and transmitting binary formats.

3. The method of claim 1, wherein the optimized message correction comprises at least one text replacement specification.

4. The method of claim 3, wherein the at least one text replacement specification comprises:

a start character index;

an end character index; and insertion text.

5. A method performed on an instant messaging server, the method comprising:

receiving a query from an instant messaging originating client system during an ongoing instant messaging conversation between the instant messaging originating client system and an instant messaging recipient client system as to whether the instant messaging server requires a message correction specification comprising a complete message resend or whether the instant messaging server requires a message correction specification comprising an optimized message correction;

sending to the instant messaging originating client system a response to the query;

receiving, at an instant messaging server, the message correction specification and a message identifier (ID) from an instant messaging originating client system during an ongoing instant messaging conversation between the instant messaging originating client system and an instant messaging recipient client system, wherein the message correction specification specifies a correction to an instant message that was previously sent from the instant messaging originating client system, wherein the message correction specification comprises one of: the complete message resend and the optimized message correction, based on the response to the query;

sending, from the instant messaging server during the ongoing instant messaging conversation, the message correction specification and the message ID to the instant messaging recipient client system if an instant message with a corresponding message ID has previously been sent from the instant messaging server to the instant messaging recipient client system; and updating, during the ongoing instant messaging conversation, a conversation log displayed at the instant messaging recipient client system with a corrected message that reflects the message correction specification.

6. The method of claim 5, including the step of:

alerting a user of the instant messaging recipient client system of the update of the conversation log displayed at the instant messaging recipient client system.

7. The method of claim 5, wherein the optimized message correction comprises at least one text replacement specification.

8. The method of claim 7, wherein the at least one text replacement specification comprises:

a start character index;

an end character index; and insertion text.

9. A method performed on a messaging server, the method comprising:

receiving an original message and a message identifier (ID) from an instant messaging originating client system and destined for reception by an instant messaging recipient client system;

maintaining an ephemeral storage log of an instant messaging conversation between the instant messaging originating client system and the instant messaging recipient client system;

receiving a query from an instant messaging originating client system as to whether the instant messaging server requires a message correction specification comprising a complete message resend or whether the instant messaging server requires a message correction specification comprising an optimized message correction;

sending to the instant messaging originating client system a response to the query;

receiving a message correction specification and the message ID from the instant messaging originating client system during the instant messaging conversation, wherein the message correction specification comprises one of: the complete message resend and the optimized message correction, based on the response to the query;

determining if a message processing service is required for the received message correction specification;

correcting, based on the received message correction specification and during the instant messaging conversation, the original message having the corresponding message ID in the ephemeral storage log, if the message processing service is required, thereby producing a corrected message; and sending a correction message and the message ID to the instant messaging recipient client system during the instant messaging conversation, wherein the correction message represents a difference between the original message processed by the message processing service and the corrected message processed by the message processing service.

10. The method of claim 9, wherein the determining step comprises determining whether at least one factor of the following corresponds to a system:

language translation;

correction of binary format information in a message;

correction of image information in a message;

system processing efficiency; and network communication efficiency.

11. The method of claim 9, wherein the optimized message correction comprises at least one text replacement specification.

12. The method of claim 11, wherein the at least one text replacement specification comprises:

a start character index;

an end character index; and insertion text.

* * * * *